(12) United States Patent
Kang et al.

(10) Patent No.: US 12,441,637 B2
(45) Date of Patent: Oct. 14, 2025

(54) WATER TREATMENT DEVICE USING UNDERWATER PLASMA DISCHARGE

(71) Applicant: Pure Platech Co., Ltd., Hwaseong-si (KR)

(72) Inventors: Kyoung Doo Kang, Seongnam-si (KR); Kyoung Jun Ko, Hwaseong-si (KR); Min Jae Kim, Suwon-si (KR); Seon Mi Lee, Pocheon-si (KR)

(73) Assignee: Pure Platech Co., Ltd., Hwaseong-si (KR)

( * ) Notice: Subject to any disclaimer, the term of this patent is extended or adjusted under 35 U.S.C. 154(b) by 788 days.

(21) Appl. No.: 17/774,150

(22) PCT Filed: Jun. 2, 2020

(86) PCT No.: PCT/KR2020/007131
§ 371 (c)(1),
(2) Date: May 4, 2022

(87) PCT Pub. No.: WO2021/091037
PCT Pub. Date: May 14, 2021

(65) Prior Publication Data
US 2022/0388875 A1 Dec. 8, 2022

(30) Foreign Application Priority Data
Nov. 8, 2019 (KR) .......................... 10-2019-0142348

(51) Int. Cl.
*C02F 1/46* (2023.01)
*C02F 1/461* (2023.01)
(Continued)

(52) U.S. Cl.
CPC ........ *C02F 1/4608* (2013.01); *C02F 1/46109* (2013.01); *C02F 1/4672* (2013.01); *H05H 1/2406* (2013.01)

(58) Field of Classification Search
CPC .. C02F 1/4608; C02F 1/46109; C02F 1/4672; C02F 1/30; C02F 2103/10; C02F 1/325;
(Continued)

(56) References Cited

U.S. PATENT DOCUMENTS

2018/0002203 A1* 1/2018 Yokoyama ........... H05H 1/2406
2019/0016612 A1* 1/2019 Park ...................... C02F 1/4608
(Continued)

FOREIGN PATENT DOCUMENTS

JP 2017-016814 A 1/2017
KR 10-2009-0097340 A 9/2009
(Continued)

OTHER PUBLICATIONS

International Search Report for PCT/KR2020/007131 mailed Sep. 9, 2020 from Korean Intellectual Property Office.

*Primary Examiner* — Xiuyu Tai
(74) *Attorney, Agent, or Firm* — Revolution IP, PLLC (57) ABSTRACT

A water treatment device includes: an electrode structure installed in a storage space in which water is stored or in a flow space in which water flows so as to cause an underwater plasma discharge; and a gas supply module for supplying a gas to the storage space or the flow space such that bubbles are supplied underwater, as a discharge gas, to the electrode structure, wherein the electrode structure includes: a first electrode; a second electrode disposed opposite the first electrode; and a dielectric member disposed in a space between the first electrode and the second electrode.

20 Claims, 7 Drawing Sheets

(51) Int. Cl.
*C02F 1/467* (2023.01)
*H05H 1/24* (2006.01)
(58) Field of Classification Search
CPC  C02F 1/725; C02F 2305/10; C02F 2301/026; H05H 1/2406; H05H 1/3468; H05H 1/48; H01J 37/32; H01J 37/3244; H01J 37/32568; H01J 37/32541; H01J 37/32596; H01J 37/32055
See application file for complete search history.

(56) References Cited

U.S. PATENT DOCUMENTS

| | | | |
|---|---|---|---|
| 2019/0241447 A1* | 8/2019 | Kang | H01J 37/32568 |
| 2021/0235573 A1* | 7/2021 | Mujahid | H05H 1/2406 |

FOREIGN PATENT DOCUMENTS

| | | | |
|---|---|---|---|
| KR | 10-2011-0056345 A | 5/2011 | |
| KR | 10-1061227 B1 | 8/2011 | |
| KR | 10-2015-0068579 A | 6/2015 | |

* cited by examiner

WATER TREATMENT DEVICE USING UNDERWATER PLASMA DISCHARGE

TECHNICAL FIELD

The present invention relates to water treatment technology, and more particularly, to a water treatment device using an underwater plasma discharge.

BACKGROUND ART

An underwater plasma discharge is technology for making a plasma state using an underwater discharge, and is mainly used in water treatment for improvements in the quality of water.

As a prior-art patent document related to the technical field of the present invention, Korean Patent Registration No. 10-1061227 discloses a hydrogen radical water and hydrogen oxygen gas generating apparatus using an underwater plasma discharge. The apparatus disclosed in the prior-art patent document includes a first electrode, and a second electrode being spaced apart from the first electrode and causing a plasma discharge in water in a gap between the second electrode and the first electrode. In an electrode structure for an underwater plasma discharge according to the related art having such a configuration, the larger the gap between two electrodes, the more advantageous the processing capacity increases, but there is a limitation in an increase in the gap between two electrodes. Thus, a large number of electrodes and a high voltage are required for the required processing capacity, and there is a limitation in the improvement in the efficiency of power use.

In the agricultural field, the development of fertilizers, which are nutrient materials added to the soil or plants, so as to maintain or enhance the productivity of the soil and to grow crops well, has been steadily made. Fertilizers are classified into basic fertilizer and additional fertilizer depending on fertilization methods, are classified into granular fertilizer, powdered fertilizer, filamentous fertilizer, solid fertilizer and liquid fertilizer depending on manufacturing methods and properties, and are classified into organic fertilizer, inorganic fertilizer and mineral fertilizer depending on raw materials, and also, fertilizers are classified into sweet fertilizer, complex fertilizer, BB fertilizer, nitrogen fertilizer, phosphate fertilizer, trace fertilizer and trace urea fertilizer depending on main components, and are classified into fast-acting fertilizer, slow-fertilizer, and long-acting fertilizer depending on effects, and are classified into water fertilizer, horticultural fertilizer and fruit water fertilizer depending on the use. Liquid fertilizer consisting of liquid called a double liquid is manufactured by diluting powdered or granular fertilizer. In addition, liquid fertilizer or supplied water are sterilized to reduce harmful insects caused by bacteria.

DETAILED DESCRIPTION OF THE INVENTION

Technical Problem

The present invention provides a water treatment device using an underwater plasma discharge in which a plasma processing capacity is enhanced.

The present invention also provides a water treatment device in which a culture solution for cultivation is produced and sterilized using an underwater plasma discharge.

Technical Solution

According to an aspect of the present invention, there is provided a water treatment device using an underwater plasma discharge, the water treatment device including: an electrode structure installed in a storage space in which water is stored or in a flow space in which water flows so as to cause an underwater plasma discharge; and a gas supply module for supplying a gas to the storage space or the flow space such that bubbles are supplied underwater, as a discharge gas, to the electrode structure, wherein the electrode structure includes a first electrode, a second electrode disposed opposite the first electrode, and a dielectric member disposed in a space between the first electrode and the second electrode, and the first electrode has a first seating hole formed therein such that a part of the dielectric member is inserted and seated therein, and the first seating hole has a bubble inflow passage disposed therein such that same is not covered by the dielectric member when the dielectric member is seated therein, and bubbles supplied by the gas supply module through the bubble inflow passage flow into the space between the first electrode and the second electrode, thereby causing an underwater plasma discharge in the space between the first electrode and the second electrode.

Effects of the Invention

According to the present invention, all of the objectives of the present invention described above can be achieved. In detail, a plurality of dielectric members causing a start discharge are arranged in a space formed between a lower electrode and an upper electrode, and in a state in which the plurality of dielectric members are seated in seating holes formed in the lower electrode, micro-bubbles as a discharge gas are introduced into the space between two electrodes through the seating holes and then rise and are discharged so that the efficiency of an underwater plasma discharge is enhanced and the performance of water treatment including sterilization is increased.

In addition, a discharge gas containing nitrogen, as in air, is supplied to an electrode structure causing an underwater plasma discharge so that nitrogen fertilizer components are generated underwater and thus a culture medicine containing nitrogen fertilizer components can be produced.

MODE OF THE INVENTION

Hereinafter, the configuration and operation of embodiments of the present invention will be described in detail with reference to the accompanying drawings.

Figure 1:
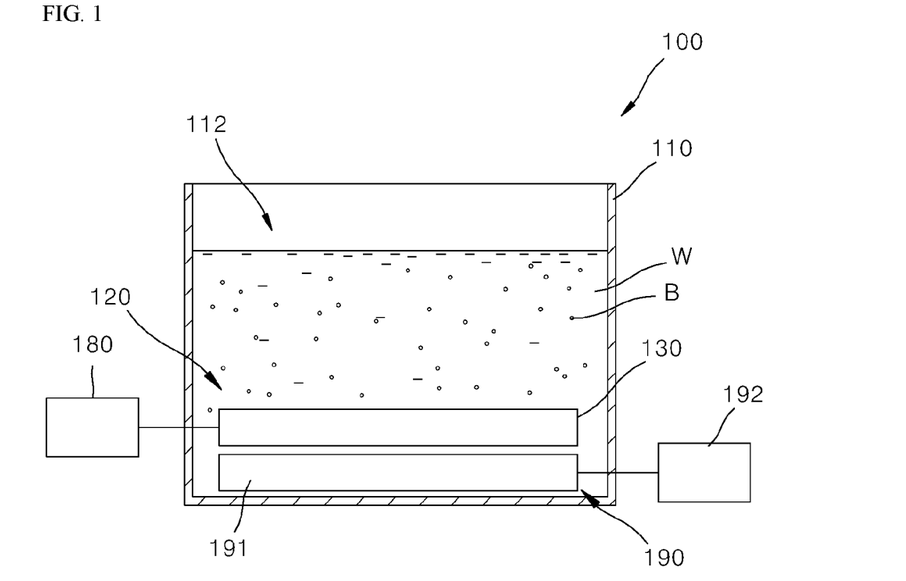
FIG. 1 is a view schematically illustrating the configuration of a water treatment device using an underwater plasma discharge according to an embodiment of the present invention.
Figure 2:
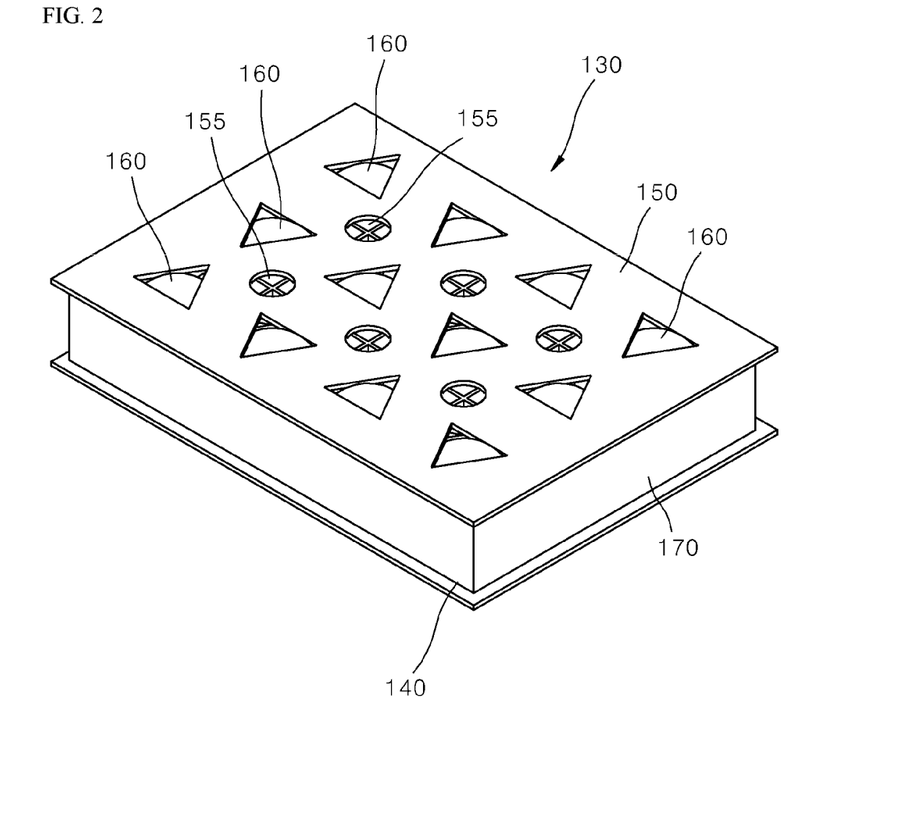
FIG. 2 is a perspective view illustrating an embodiment of an electrode structure in the water treatment device using an underwater plasma discharge shown in FIG. 1.

FIG. 1 illustrates the schematic configuration of a water treatment device using an underwater plasma discharge according to an embodiment of the present invention. Referring to FIG. 1, the water treatment device 100 using an underwater plasma discharge according to an embodiment of the present invention that is a device for water treatment using plasma caused by an underwater discharge, includes a water tank 110 in which water to be treated W is stored, a plasma discharge module 120 that causes a plasma discharge in the water to be treated W stored in the water tank 110, and a gas supply module 190 for supplying a discharge gas in the form of micro-bubbles B to the water to be treated W stored in the water tank 110. The water treatment device 100 decomposes and removes contaminants and harmful bacteria included in the water to be treated W stored in the water tank 110 using an underwater plasma discharge.

The water tank 110 provides a storage space 112 in which the water to be treated W is stored. The contaminants and the harmful bacteria included in the water to be treated W stored in the storage space 112 are decomposed and removed by an underwater plasma discharge so that the water to be treated W is water-treated.

The plasma discharge module 120 receives the discharge gas from the gas supply module 190 in the water to be treated W stored in the water tank 110 and causes a plasma discharge. The plasma discharge module 120 includes an electrode structure 130 disposed in the storage space 112 of the water tank 110, and a power supply unit 180 for supplying power to the electrode structure 130.

The electrode structure 130 is disposed in the storage space 112 of the water tank 110 for an underwater plasma discharge. In the drawings, only one electrode structure 130 is disposed in the storage space 112 of the water tank 110, however, the present invention is not limited thereto, and a plurality of electrode structures 130 may be arranged and used, and this also belongs to the scope of the present invention. FIGS. 2 through 6 are views according to an embodiment of the electrode structure 130. Referring to FIGS. 2 through 6, the electrode structure 130 includes a lower electrode 140 that is a first electrode, an upper electrode 150 that is a second electrode disposed above the lower electrode 140, a plurality of dielectric members 160 arranged between the lower electrode 140 and the upper electrode 150, and a barrier wall member 170 arranged between the lower electrode 140 and the upper electrode 150. In the present embodiment, the first electrode 140 is disposed below the second electrode 150, and the second electrode 150 is disposed above the first electrode 140, however, unlike this, two electrodes 140 and 150 may be arranged to face each other in an erected form or an inclined form, and this also belongs to the scope of the present invention. Also, the present invention is not limited to provision of the barrier wall member 170, and the barrier wall member 170 may not be disposed.

Referring to FIGS. 2 through 7, the lower electrode 140 has a flat plate shape and is arranged horizontally perpendicular to a generally vertical direction. A plurality of lower seating holes 142 that are first seating holes in which the plurality of dielectric members 160 are respectively seated, are formed in the lower electrode 140. The plurality of lower seating holes 142 are disposed to be generally uniformly distributed on the lower electrode 140. The lower seating holes 142 have the size and the shape at which the dielectric members 160 may be seated. Lower parts of the dielectric members 160 are put in the lower seating holes 142, and the lower parts of the dielectric members 160 protrude downward through the lower searing holes 142. In the present embodiment, as shown in the drawings, the lower parts of the dielectric members 160 protrude toward the lower part of the lower electrode 140 through the lower seating holes 142, but unlike this, the dielectric members 160 may not protrude toward lower parts of the lower seating holes 142 according to the thickness of the lower electrode 140 or the sizes of the lower seating holes 142. In the present embodiment, the lower seating holes 142 have triangular shapes including equilateral triangles, as shown in the drawings. When the dielectric members 160 are seated in the lower seating holes 142, the central region (an inside of a circle shown by a dash-double dotted line in FIG. 7) of the entire region of the lower seating holes 142 is closed by the lower parts of the dielectric members 160, and the remaining peripheral region (an outside of the circle shown by the dash-double dotted line in FIG. 7) is opened. The rising micro-bubbles B pass through the peripheral region of the lower seating holes 142 that is not closed by the dielectric members 160 but is opened. In the embodiment shown in FIGS. 2 through 7, the lower seating holes 142 have triangular shapes, but the present invention is not limited thereto, and any shape of lower seating holes which are in contact with the dielectric members 160 at two or more points to support the dielectric members, may be used, and any shape of lower seating holes which are in contact with the dielectric members 160 at three or more points to stably support the dielectric members 160, is preferable.

Figure 8:
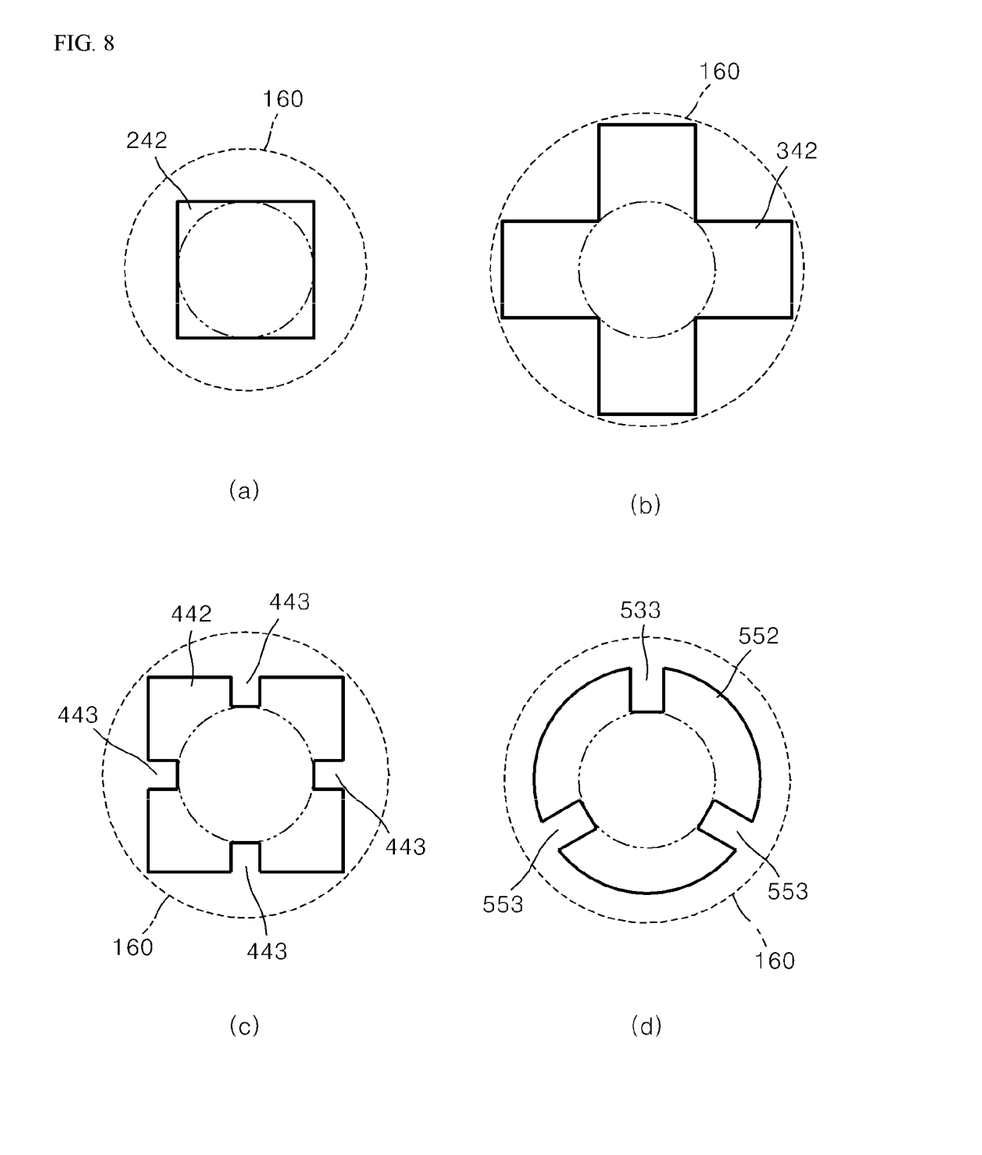
FIG. 8 is a view illustrating other embodiments of lower seating holes shown in FIG. 7.

FIG. 8 illustrates other available embodiments of lower seating holes. A region of an inside of a circle shown by a dash-double dotted line in FIG. 8 means a region of the lower seating holes that is closed by the dielectric members 160, and a region of an outside of the circle shown by the dash-double dotted line in FIG. 8 means an opened region. Referring to (a) of FIG. 8, lower seating holes 242 having rectangular shapes including equilateral rectangles are in contact with the dielectric members 160 at four points. Referring to (b) of FIG. 8, lower seating holes 342 having cross shapes are in contact with the dielectric members 160 at four points of inner edges. Referring to (c) of FIG. 8, the lower seating holes having generally rectangular shapes include four leg portions 443 extending from each side part inward. An end of each of four leg portions 443 is in contact with the dielectric members 160. Referring to (d) of FIG. 8, the lower seating holes 552 having generally circular shapes include three leg portions 553 that extend from the edges inward, are spaced apart from each other in a circumferential direction and are sequentially arranged. An end of each of three leg portions 553 is in contact with the dielectric members 160. A discharge is concentrated on the leg portions 443 and 553 of (c) and (d) of FIG. 8 so that the effect of an underwater plasma discharge can be enhanced. There may be one, two or five or more leg portions 443 and 553, and this also belongs to the scope of the present invention.

Referring back to FIGS. 2 through 6, the upper electrode 150 having a flat plate shape is arranged in parallel to the lower electrode 140 generally horizontally perpendicular to the vertical direction, and is disposed above the lower electrode 140 while being spaced apart from the lower electrode 140. The upper electrode 150 includes a plurality of upper seating holes 152 that are second seating holes, and a plurality of bubble discharge holes 155.

The plurality of upper seating holes 152 are disposed to correspond to the plurality of lower seating holes 142 one-to-one in a direction of the height. Upper parts of the dielectric members 160 are respectively inserted into the plurality of upper seating holes 152 so that the dielectric members 160 can be stably supported. The upper parts of the dielectric members 160 protrude toward the upper parts of the upper seating holes 152. In the present embodiment, as shown in the drawings, the upper parts of the dielectric members 160 protrude toward the upper parts of the upper electrodes 150 through the upper seating holes 152, however, unlike this, the dielectric members 160 may not protrude toward the upper parts of the upper seating holes 152 according to the thickness of the upper electrode 150 or the sizes of the upper seating holes 152. In the present embodiment, the upper seating holes 152 have triangles including equilateral triangles like in the lower seating holes 142, as shown in the drawings, however, the present invention is not limited thereto, and any shape of upper seating holes 152 which are in contact with the dielectric members 160 at two or more points to support the dielectric members, may be used, and any shape of upper seating holes which are in contact with the dielectric members 160 at three or more points to stably support the dielectric members 160, is preferable. When the upper parts of the dielectric members 160 are seated in the upper seating holes 152, the central region (an inside of a circle shown by a dash-double dotted line in FIG. 4) of the entire region of the upper seating holes 152 is closed by the upper parts of the dielectric members 160, and the remaining peripheral region (an outside of the circle shown by the dash-double dotted line in FIG. 4) is opened. The rising micro-bubbles B pass through the peripheral region of the upper seating holes 152 that is not closed by the dielectric members 160 but is opened. In the embodiment shown in FIGS. 2 through 6, the upper seating holes 152 have triangular shapes, however, the present invention is not limited thereto, and there may be various shapes like in the seating holes shown in FIG. 8, and this also belongs to the scope of the present invention.

The plurality of bubble discharge holes 155 are disposed to be generally uniformly distributed between the plurality of upper seating holes 152 in the upper electrode 152. The rising micro-bubbles B pass through the bubble discharge holes 155 and are discharged from a space between two electrodes 140 and 150.

The present invention further includes a case where a dielectric layer is formed on at least one of the lower electrode 140 and the upper electrode 150, and this also belongs to the scope of the present invention. The dielectric layer formed on the lower electrode 140 or the upper electrode 150 may be an aluminium oxide ($Al_2O_3$) film formed by anodizing, and ceramic or resin-based materials may be used for the dielectric layer formed on the lower electrode 140 or the upper electrode 150.

In the above-described embodiments, the entire region of the electrode structure 130 is immersed in water to be treated W, however, unlike this, at least a part of the first electrode 140 and at least a part of the second electrode 150 may be immersed, and this also belongs to the scope of the present invention. Also, in the present embodiment, the electrode structure 130 is installed not to flow into the water tank 110 but to be immersed in the water to be treated W stored in the water tank 110, however, the present invention is not limited thereto, and the entire or part of the electrode structure 130 may be installed to be immersed in a flowing water to be treated, and this also belongs to the scope of the present invention.

The plurality of dielectric members 160 are arranged to be spaced apart from each other to be generally uniformly distributed between the lower electrode 140 and the upper electrode 150. In the present embodiment, as shown in the drawings, the dielectric members 160 have ball shapes, however, unlike this, the dielectric members 160 may have various other shapes such as pillar shapes, and this also belongs to the scope of the present invention. All of shapes in which the dielectric members 160 may be seated in the lower seating holes 142 formed in the lower electrode 140 and the upper seating holes 152 formed in the upper electrode 140, are possible. In a state in which an electric field is formed between the lower electrode 140 and the upper electrode 150, a start discharge for forming plasma occurs between the plurality of dielectric members 160, and the bubbles B are attached onto the surface of the dielectric members 160 so that a staying time in a discharge space of the bubbles B increases, and the intensity of an electric field in the micro-bubbles B in the vicinity of the dielectric members 160 increases. Thus, a distance between two electrodes 140 and 150 increased with respect to the same power applied between two electrodes 140 and 150 can be obtained so that a large amount of discharge gas bubbles pass through a large area, and this means an increase in a plasma process capacity. Also, because a voltage of power applied to two electrodes 140 and 150 can be reduced by the plurality of dielectric members 160 with respect to the same distance between two electrodes 140 and 150, this is advantageous in view of power consumption. To this end, a nonconductor having a higher permittivity than the permittivity of a discharge gas (for example, air) supplied by the gas supply module 190 is used for the dielectric members 160. This means that conductive water disturbs a discharge but the effect of helping a discharge of air and water using dielectric substances having polarization characteristics during alternating current is used. In the present embodiment, a ceramic material is used for the dielectric members 160, and alumina ($Al_2O_3$) or titanium dioxide ($TiO_2$) may be used for the dielectric members 160. Titanium dioxide ($TiO_2$) serves as a photocatalyst by ultraviolet rays generated by plasma. Also, a high-strength resin-based dielectric substance such as Teflon may also be used as the dielectric member 160, and this also belongs the scope of the present invention. The dielectric members 160 also serve to trap the micro-bubbles B.

The barrier wall member 170 is disposed between the lower electrode member 140 and the upper electrode member 150. The barrier wall member 170 is formed of a dielectric material, and is fixed to one of the lower electrode member 140 and the upper electrode member 150 or to all of the two electrode members 140 and 150. The barrier wall member 170 includes a plurality of unit barrier wall portions 171. Each of the plurality of unit barrier wall portions 171 provides an internal space having a size at which one dielectric member 160 may be accommodated. The unit barrier wall portions 171 surround sides of the accommodated dielectric member 160 in a state in which it is disposed between two electrode members 140 and 150. A lower part of the unit barrier wall portion 171 facing the lower electrode member 140 and an upper part of the unit barrier wall portion 171 facing the upper electrode member 150 are respectively opened so that the internal space of the unit barrier wall portion 171 is in communication with each of the lower seating holes 142 and the upper seating holes 152. In the present embodiment, each of the plurality of unit barrier wall portions 171 is in contact with all of the lower electrode member 140 and the upper electrode member 150, however, unlike this, each of the plurality of unit barrier wall portions 171 may not be in contact with one electrode member according to the height of the unit barrier wall portions 171, and this also belongs to the scope of the present invention. An underwater plasma discharge may be concentrated in the lower seating holes 142 and the upper seating holes 152 by each of the plurality of unit barrier wall portions 171. Also, the unit barrier wall portions 171 serve to stably maintain the positions of the accommodated dielectric member 160. When the barrier wall member 170 is used, even though the lower seating holes 142 and the upper seating holes 152 are in contact with the dielectric members 160 at two points, the dielectric members 160 may be stably disposed in the corresponding regions of the lower seating holes 142 and the upper seating holes 152 by the barrier wall member 170.

Referring back to FIG. 1, the power supply unit 180 supplies power to the electrode structure 130. Power is supplied to the electrode structure 130 by the power supply unit 180 so that an electric field is formed between the lower electrode 140 and the upper electrode 150, and thus, a discharge for forming plasma occurs between two electrodes 140 and 150. In the present embodiment, the power supply unit 180 applies an alternating current to the lower electrode 140 and the upper electrode 150, and the present invention is not limited thereto. For example, one electrode of the lower electrode 140 and the upper electrode 150 functions as a ground electrode, and the other one electrode thereof is connected to the power supply unit 180 and functions as a driving electrode, and the power supply unit 180 may apply an alternating current voltage or a pulse voltage to an electrode functioning as a driving electrode of two electrodes 140 and 150. An electric field is formed between the lower electrode 140 and the upper electrode 150 by the power supply unit 180, and thus, a discharge for forming plasma occurs between the lower electrode 140 and the upper electrode 150, and in particular, a discharge may easily occur in the micro-bubbles B using a strong electric field generated at edges of the seating holes 142 and 150.

The gas supply module 190 supplies a discharge gas in the form of bubbles to the electrode structure 130 in the water to be treated W stored in the water tank 110, and preferably, in the form of bubbles having the size of 1 to 2 mm, and most preferably, in the form of micro-bubbles having the size of several μm to several hundreds of μm. The gas supply unit 190 includes nozzle units 191, which are arranged under the electrode structure 130 and which supply the micro-bubbles B as a discharge gas to the electrode structure 130, and a gas supply pump 192 for supplying gas such as air. Although not shown, each of the nozzle units 191 includes a plurality of bubble injection holes, and preferably, each of the plurality of bubble injection holes is aligned to be disposed to correspond to each of the plurality of lower seating holes 142 one-to-one. It is preferable that the nozzle units 191 supply the micro-bubbles B to correspond to each of the plurality of lower seating holes 142 formed in the lower electrode 140 of the electrode structure 130. The micro-bubbles B discharged from the nozzle units 191 rise, are introduced into a space formed between the lower electrode 140 and the upper electrode 150 from the lower seating holes 142 through the opened region of the dielectric members 160, and include sterilization components such as OH radical and ozone generated by the underwater plasma discharge.

Micro-bubbles between the lower electrode 140 and the upper electrode 150 rise, are discharged through the upper seating holes 152 and the bubble discharge holes 155 formed in the upper electrode 150, and are used for water treatment such as sterilization of the water to be treated W in the water tank 110.

However, the water treatment device using an underwater plasma discharge according to the present invention may perform various functions in addition to a sterilization function. That is, the water treatment device may produce a culture solution for cultivation using an underwater plasma discharge. This will be described in more detail as follows. When a gas such as air including nitrogen ($N_2$) is supplied through the gas supply module 190, gas bubbles B including nitrogen are plasma-treated together with water by a plasma discharge, generate nitrogen fertilizer components such as nitric acid ions ($NO_3^-$) and ammonium ions ($NH_4^+$), are molten in water and remain therein so that a culture solution that is water containing fertilizer components is produced. Sterilizing $OH^-$ is additionally generated during an underwater plasma discharge for producing fertilizer components so that the present invention also includes a sterilization function.

Figure 3:
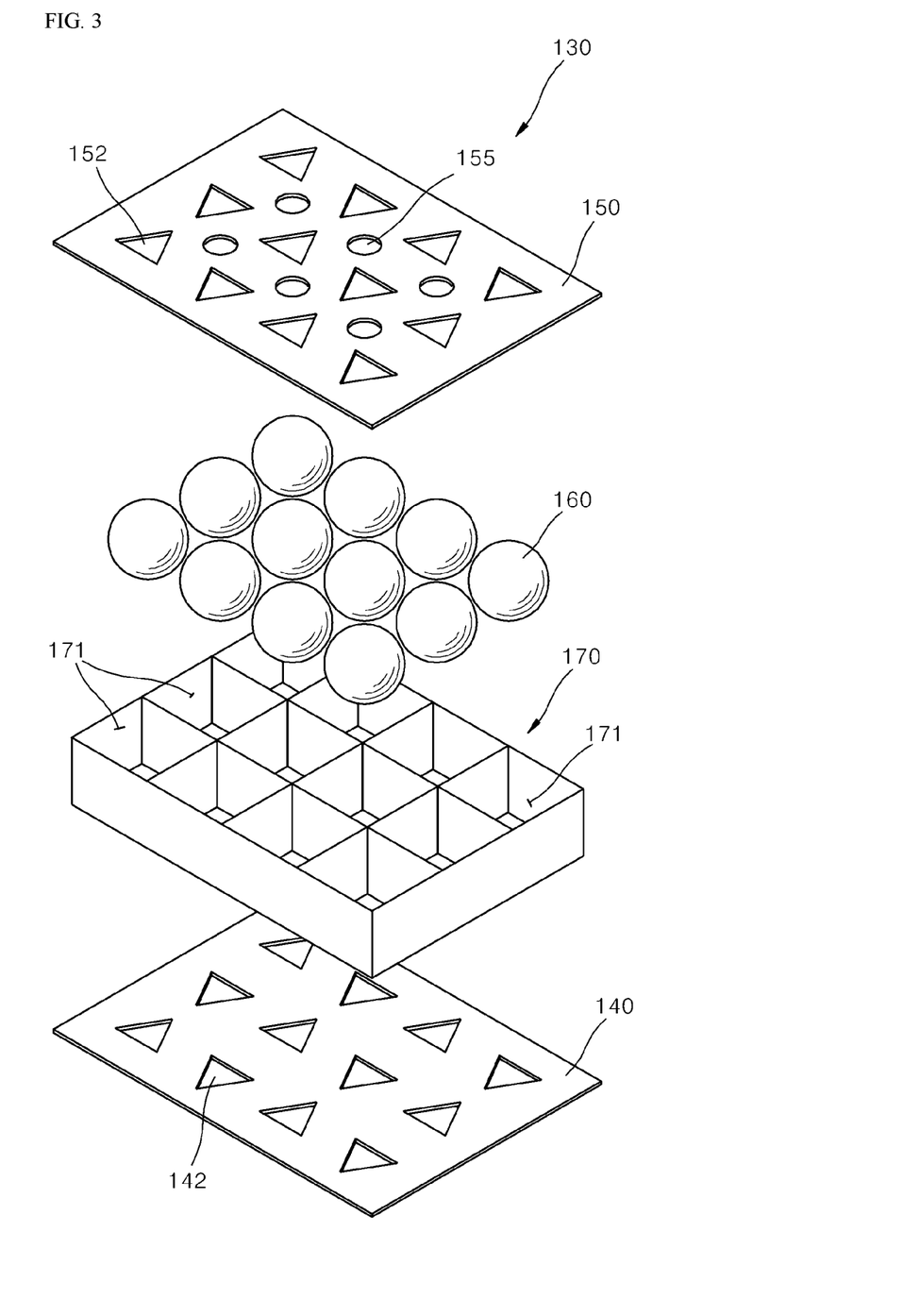
FIG. 3 is an exploded perspective view of the electrode structure shown in FIG. 2.
Figure 4:
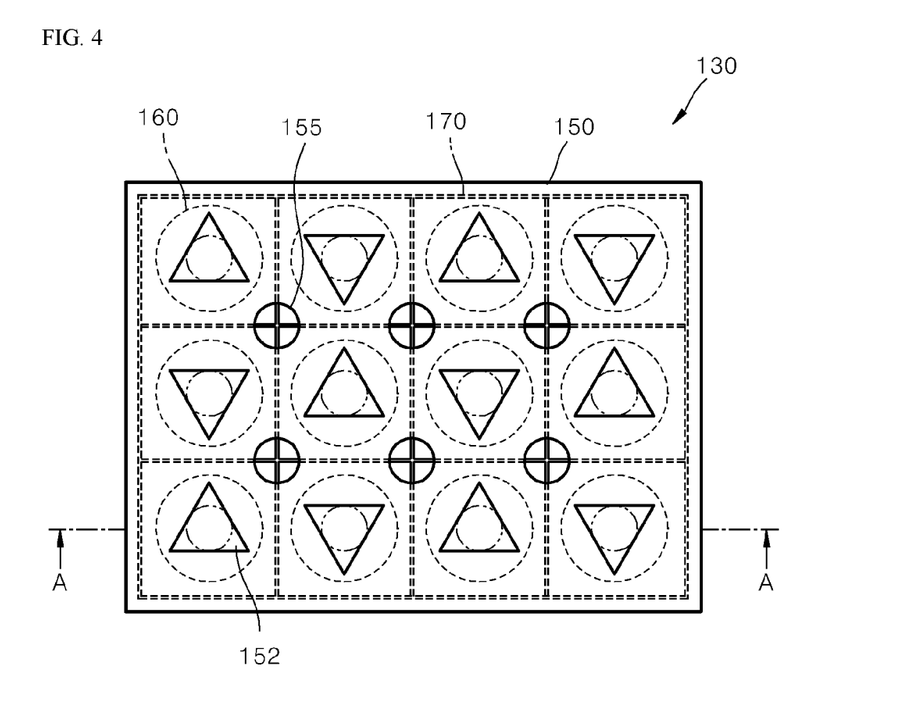
FIG. 4 is a plan view of the electrode structure shown in FIG. 2.
Figure 5:
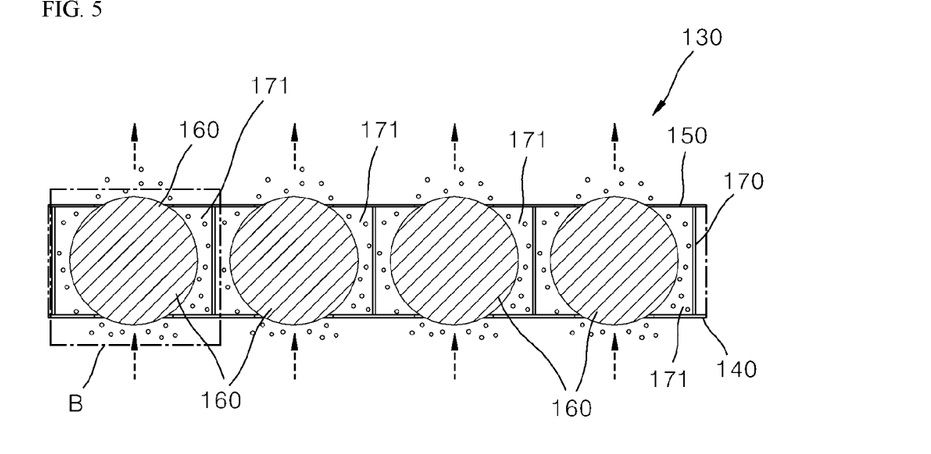
FIG. 5 is a side cross-sectional view of the electrode structure shown in FIG. 4, taken along a line A-A'.
Figure 6:
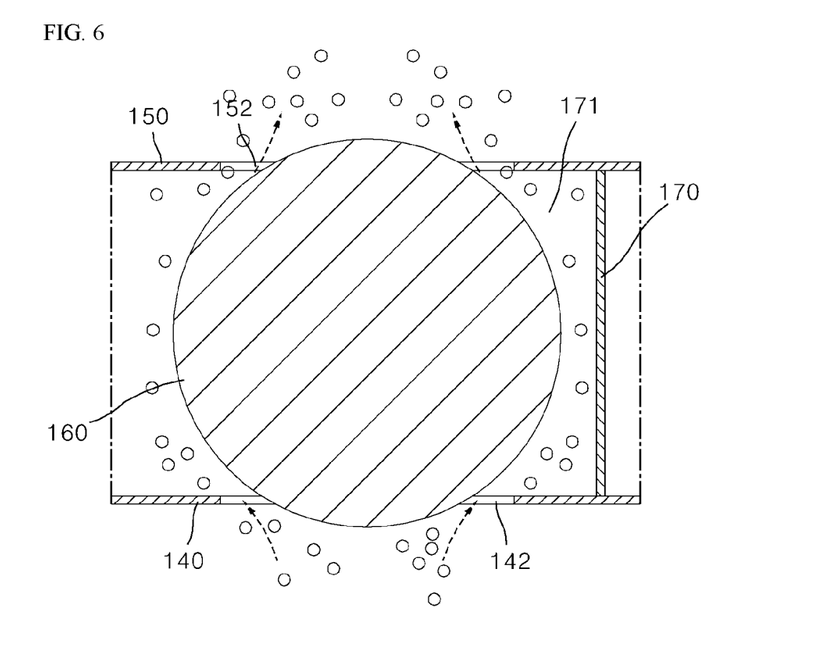
FIG. 6 is an enlarged view of portion B in FIG. 5.
Figure 7:
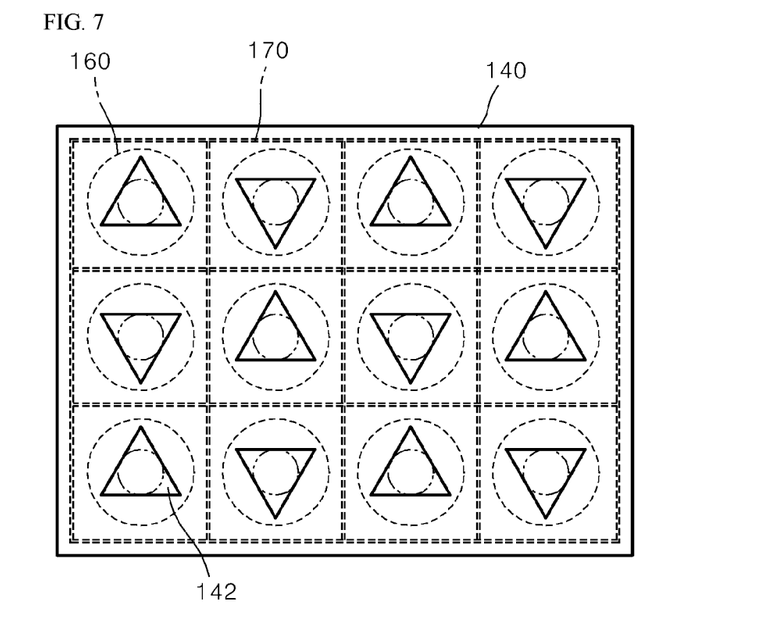
FIG. 7 is a plan view of a lower electrode shown in FIG. 3.
Figure 9:
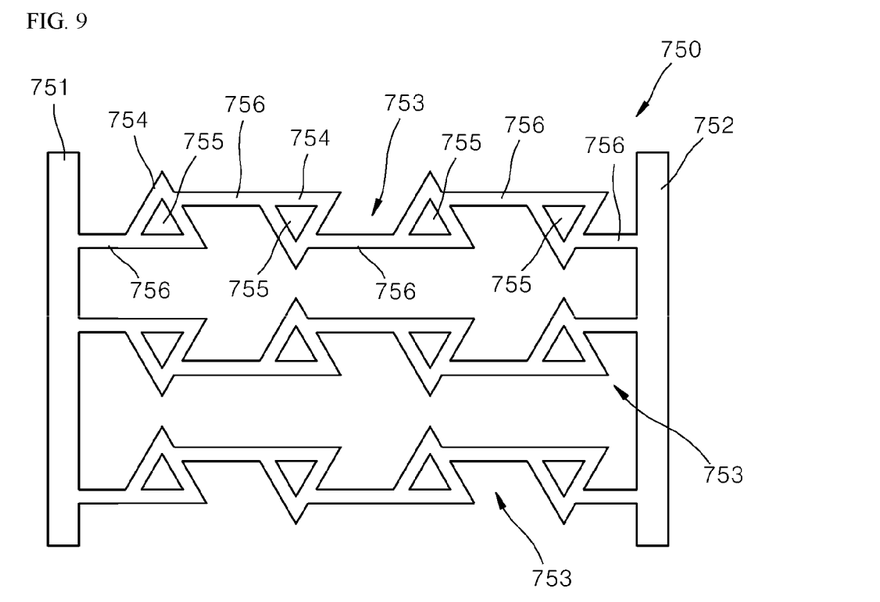
FIG. 9 is a view illustrating another embodiment of an upper electrode shown in FIG. 3.

FIG. 9 is a view illustrating another embodiment of an upper electrode shown in FIG. 3. Referring to FIG. 9, an upper electrode 750 according to another embodiment of the present invention includes two support fixtures 751 and 752, and a plurality of connection portions 753 connected between two support fixtures 751 and 752.

Two support fixtures 751 and 752 each having a shape of a rod extending in a straight line are arranged to be spaced apart from each other one parallel to the other. The plurality of connection portions 753 are disposed between two support fixtures 751 and 752.

Each of the plurality of connection portions 753 is disposed between two support fixtures 751 and 752, is connected to two support fixtures 751 and 752 and thus is integrally combined with each other.

The connection portions 753 include a plurality of cover plate portions 754 and a plurality of extensions 756. The plurality of cover plate portions 754 are spaced apart from each other, and upper seating holes 755 are formed in each of the plurality of cover plate portions 754. In the present embodiment, the upper seating holes 755 have triangular shapes, however, unlike this, other various shapes shown in FIG. 8 may be used, and this also belongs to the scope of the present invention. The plurality of extensions 756 may connect two adjacent cover plate portions 754 to each other or may connect the cover plate portions 754 to the support fixtures 751 and 752.

Figure 10:
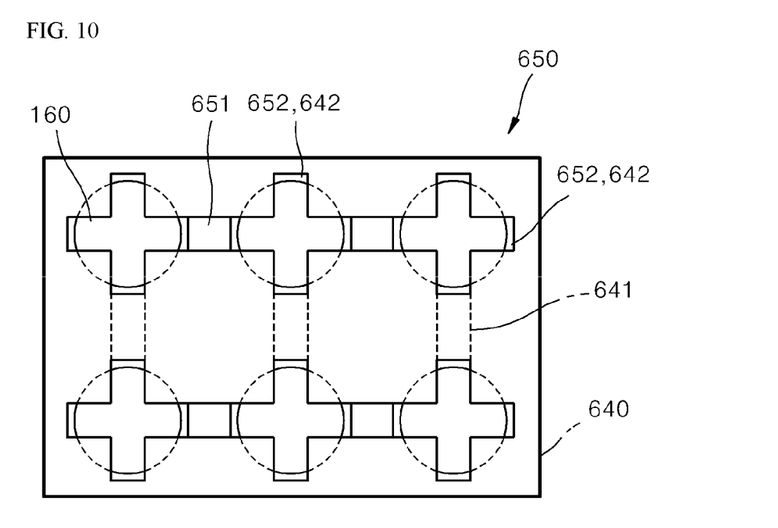
FIG. 10 is a plan view of an electrode structure according to another embodiment of the present invention.
Figure 11:
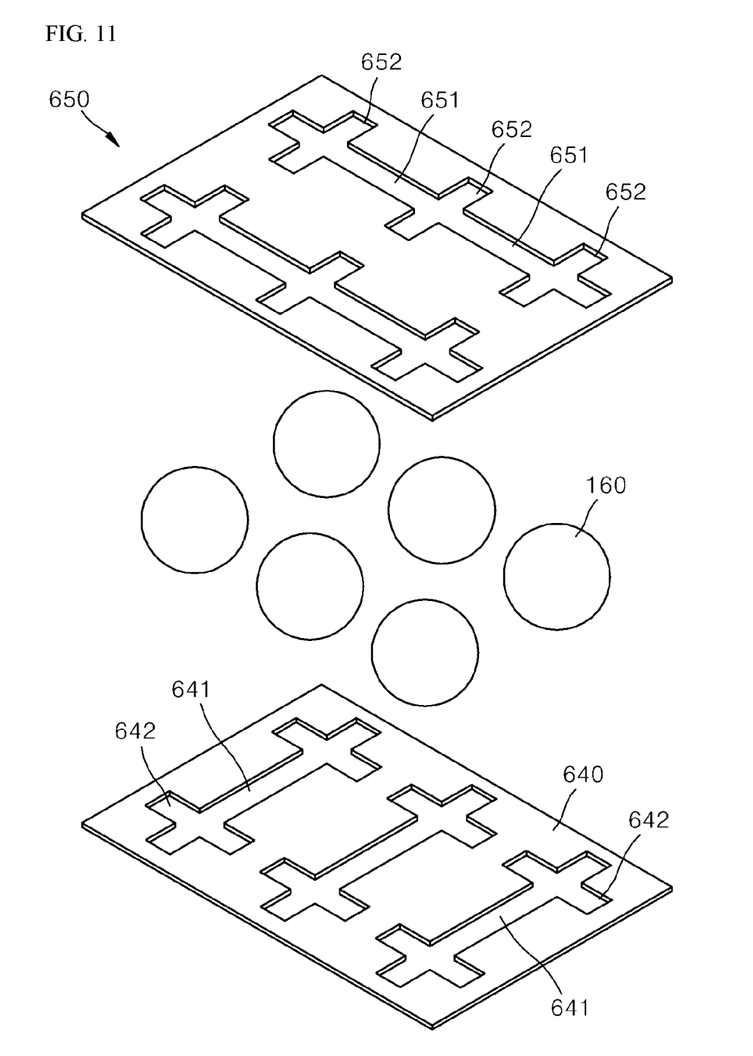
FIG. 11 is an exploded perspective view of the electrode structure shown in FIG. 10.

FIGS. 10 and 11 illustrate an electrode structure according to another embodiment of the present invention. Referring to FIGS. 10 and 11, an electrode structure 650 includes an upper electrode 650 that is a first electrode, an upper electrode 650 that is a second electrode disposed above the lower electrode 640, and a plurality of dielectric members 160 arranged between the lower electrode 640 and the upper electrode 650. In the present embodiment, the first electrode 640 is disposed below the second electrode 650, and the second electrode 650 is disposed above the first electrode 640, however, unlike this, two electrodes 640 and 650 may be arranged to face each other in an erected shape or inclined shape, and this also belongs to the scope of the present invention. Although not shown, the electrode structure 650 may further include the barrier wall member 170 shown in FIG. 3, and this also belongs to the scope of the present invention.

The lower electrode 640 has a flat plate shape, and a plurality of main lower slits 641 arranged in parallel, and a plurality of auxiliary lower slits 642 positioned at each of the plurality of main lower slits 641 in a lengthwise direction are formed in the lower electrode 640.

The plurality of main lower slits 641 are arranged in the lower electrode 640 in parallel. In the present embodiment, there are three main lower slits 641, however, the present invention is not limited thereto, and there may be two or less or four or more, and this also belongs to the scope of the present invention. The auxiliary lower slits 642 are formed in a plurality of positions in the lengthwise direction of the main lower slits 641. Each of the plurality of auxiliary lower slits 642 extends to cross the main lower slits 641. In the present embodiment, two auxiliary lower slits 642 are formed in each one main lower slit 641, however, unlike this, there may be one or three or more, and this also belongs to the scope of the present invention.

Lower seating holes each having a '+'-shape in which the main lower slits 641 and the auxiliary lower slits 642 cross one another and the dielectric members 160 are seated, are formed.

The upper electrode 650 has a flat plate shape, and a plurality of main lower slits 641 arranged in parallel, and a plurality of auxiliary lower slits 642 positioned at each of the plurality of main lower slits 641 in a lengthwise direction are formed in the lower electrode 640.

The plurality of main upper slits 651 are arranged in parallel to the upper electrode 650, and are formed to extend in a direction crossing the plurality of main lower slits 641 formed in the lower electrode 640. In the present embodiment, the main upper slits 651 are arranged to be perpendicular to the main lower slits 641. In the present embodiment, two main upper slits 651 are formed to correspond to two auxiliary lower slits 642 formed in one main lower slit 641, and the present invention is not limited thereto. Auxiliary upper slits 652 are formed in a plurality of positions in the lengthwise direction of the main upper slits 651. The plurality of auxiliary lower slits 652 respectively extend to cross the main upper slits 651. In the present embodiment, two auxiliary upper slits 652 are formed in each one main upper slit 651 to correspond to the main lower slits 641, however, the present invention is not limited thereto.

Upper seating holes each having a '+'-shape in which the main upper slits 651 and the auxiliary upper slits 652 cross one another and the dielectric members 160 are seated, are formed.

While the present invention has been particularly shown and described with reference to exemplary embodiments thereof, it will be understood by those of ordinary skill in the art that various changes in form and details may be made therein without departing from the spirit and scope of the present invention as defined by the following claims.

The invention claimed is:

1. A water treatment device using an underwater plasma discharge, the water treatment device comprising:
   an electrode structure installed in a storage space in which water is stored or in a flow space in which water flows so as to cause an underwater plasma discharge;
   a power supply unit configured to supply power to the electrode structure; and
   a gas supply module for supplying a gas to the storage space or the flow space such that bubbles are supplied underwater, as a discharge gas, to the electrode structure,
   wherein the electrode structure includes a first electrode, a second electrode disposed opposite the first electrode, and a dielectric member disposed in a space between the first electrode and the second electrode, and
   the first electrode has a first seating hole formed therein such that a part of the dielectric member is inserted and seated therein, and
   the first seating hole has a bubble inflow passage disposed therein such that the bubble inflow passage is not covered by the dielectric member when the dielectric member is seated therein, and the bubbles supplied by the gas supply module through the bubble inflow passage flow into the space between the first electrode and the second electrode, thereby causing the underwater plasma discharge in the space between the first electrode and the second electrode.

2. The water treatment device of claim 1, wherein the second electrode is disposed above the first electrode.

3. The water treatment device of claim 2, wherein the gas supply module supplies the bubbles under the first electrode.

4. The water treatment device of claim 3, wherein the bubbles are supplied to correspond to a position of the first seating hole.

5. The water treatment device of claim 1, wherein the second electrode has a second seating hole formed therein such that another part of the dielectric member is inserted and seated therein, and the second seating hole has a bubble discharge passage disposed therein such that the bubble discharge passage is not covered by the dielectric member when the dielectric member is seated therein, and the bubbles are discharged from the space between the first electrode and the second electrode through the bubble discharge passage.

6. The water treatment device of claim 5, wherein the second electrode further has a bubble discharge hole formed therein through which the bubbles are discharged from the space between the first electrode and the second electrode.

7. The water treatment device of claim 5, wherein the second electrode includes a cover plate portion, which is disposed to correspond to the dielectric member and in which the second seating hole is formed.

8. The water treatment device of claim 5, wherein the first seating hole or the second seating hole has a triangular shape, a rectangular shape or a cross shape.

9. The water treatment device of claim 5, wherein at least one leg portion that extends from an edge inward and comes into contact with the dielectric member is formed in the first seating hole or the second seating hole.

10. The water treatment device of claim 5, wherein the first seating hole is a part of a first main slit formed on the first electrode, the second seating hole is a part of a second main slit formed on the second electrode, and the dielectric member is disposed at a crossing point of the first main slit and the second main slit.

11. The water treatment device of claim 10, wherein a plurality of dielectric members are provided, and at least one of the first main slit and the second main slit is in plural so that a plurality of crossing points are formed to correspond to the plurality of dielectric members.

12. The water treatment device of claim 1, wherein a plurality of dielectric members are provided, and a plurality of first seating holes are formed to correspond to the plurality of dielectric members, respectively.

13. The water treatment device of claim 12, wherein the second electrode comprises a plurality of cover plate portions disposed to correspond to the plurality of dielectric members one-to-one, and a plurality of extension portions extending to connect the plurality of cover plate portions, and a second seating hole formed therein such that a part of the corresponding dielectric member is inserted and seated therein, is formed in each of the plurality of cover plate portions.

14. The water treatment device of claim 1, wherein the bubbles are micro-bubbles.

15. The water treatment device of claim 1, wherein the dielectric member has a ball shape.

16. The water treatment device of claim 1, wherein a dielectric layer is formed on at least one of the first electrode and the second electrode.

17. The water treatment device of claim 1, wherein the gas supply module comprises a bubble injection hole through which the bubbles are discharged in the storage space or the flow space, and the bubble injection hole is aligned to be disposed to correspond to the first seating hole.

18. The water treatment device of claim 1, further comprising a barrier wall member being disposed between the first electrode and the second electrode and surrounding the dielectric member.

19. The water treatment device of claim 18, wherein a plurality of dielectric members are provided, and the barrier wall member comprises a plurality of unit barrier wall portions in which a part of the plurality of dielectric members is accommodated.

20. A water treatment device using an underwater plasma discharge, the water treatment device comprising:
an electrode structure installed in a storage space in which water is stored or in a flow space in which water flows so as to cause an underwater plasma discharge;
a power supply unit configured to supply power to the electrode structure; and
a gas supply module for supplying a gas to the storage space or the flow space such that bubbles are supplied underwater, as a discharge gas, to the electrode structure,
wherein the electrode structure includes a plate-shaped first electrode, a plate-shaped second electrode being disposed to facing the first electrode, a plurality of dielectric members distributed and disposed in a space between the first electrode and the second electrode, and a barrier wall member being disposed between the first electrode and the second electrode and accommodating the plurality of dielectric members, and
the first electrode has a plurality of first seating holes formed therein such that a part of each of the plurality of dielectric members is inserted and seated therein, and
the second electrode has a plurality of second seating holes formed therein such that a part of each of the plurality of dielectric members is inserted and seated therein, and
each of the plurality of first seating hole has a bubble inflow passage disposed therein such that the bubble inflow passage is not covered by the dielectric member when the dielectric member is seated therein, and each of the plurality of second seating hole has a bubble discharge passage disposed therein such that the bubble discharge passage is not covered by the dielectric member when the dielectric member is seated therein, and bubbles supplied by the gas supply module through the bubble inflow passage flow into the space between the first electrode and the second electrode and are discharged from the space between the first electrode and the second electrode through the bubble discharge passage, thereby causing the underwater plasma discharge in the space between the first electrode and the second electrode, and the barrier wall member comprises a plurality of unit barrier wall portions surrounding sides of each of the plurality of dielectric members, and each of the plurality of unit barrier wall portions are in contact with the first electrode and the second electrode.

* * * * *